United States Patent Office 3,772,283
Patented Nov. 13, 1973

3,772,283
3,5 - ANDROSTADIENO-[3,4-d]-(2'-IMINO-3'-SUB-STITUTED)-THIAZOLINES, ISOMERS THEREOF, METHODS FOR THEIR MANUFACTURE AND INTERMEDIATES USEFUL THEREIN
Thomas L. Popper, Verone, N.J., assignor to Schering Corporation, Bloomfield, N.J.
No Drawing. Filed Feb. 1, 1973, Ser. No. 328,582
Int. Cl. C07c *173/10*
U.S. Cl. 260—239.5          15 Claims

ABSTRACT OF THE DISCLOSURE 3,5-androstadieno-[3,4-d]-(2'-substituted imino-3'-substituted)thiazolines exhibiting contraceptive and antilipogenic activity and methods for their preparation are described as well as the isomeric 2,4-androstadieno-[3,4-d]-(2'-substituted imino-4'-substituted)thiazolines useful mainly as intermediates. Also described are the acid addition and quaternary alkyl halide ammonium salts of the androstadieno-[3,4 - d]-(2'-substituted imino-3'-substituted)thiazolines.

FIELD OF INVENTION

This invention relates to novel compositions-of-matter, to methods for their manufacture and to novel intermediates produced thereby.

More specifically, this invention relates to novel steroidal derivatives which may be classified as 3,5-androstadieno-[3,4-d]-(2'-imino-3'-substituted)thiazolines having contraceptive and anti-lipogenic activity, to the 3,4,5,6-tetrahydro-2,4-bis-dehydro isomers thereof, to acid addition salts thereof, and to alkyl halide quaternary ammonium salts thereof having antibacterial activity, to methods for their manufacture and to 3,5-androstadieno-[3,4-d]-(2'-imino - 3' - substituted)-thiazolines produced hereby which exhibit pharmacological properties and are useful as intermediates.

SUMMARY OF THE INVENTION

The composition-of-matter aspect of this invention resides in the concept of a chemical compound having contraceptive and anti-lipogenic activity which has a molecular structure comprising a 3,5-androstadieno-[3,4-d]-(2'-imino-3'-hydrocarbon-substituted)-thiazoline nucleus and also has at C–17 a member selected from the group consisting of oxygen, (H,βOH),

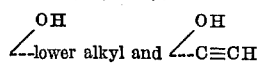
—lower alkyl and —C≡CH

Also included in my invention are the pharmaceutically acceptable acid addition salts and alkyl halide quaternary ammonium salts of the foregoing, the quaternary salts having antibacterial activity, and 3,4,5,6-tetrahydro-2,4-bis-dehydro isomers thereof.

A process of this invention comprises treating a 3-keto-4,5-oxidoandrostane with an N,N'-di-hydrocarbon substituted thiourea whereby is produced a pharmacologically active 3,5-androstadieno-[3,4-d]-(2'-hydrocarbon substituted-imino-3'-hydrocarbon substituted)thiazoline of this invention, with the proviso that acid is present when said 4-keto-4,5-oxidonandrostane starting compound consists essentially of the 4β,5β-isomer. An isomeric intermediate of the invention, i.e. a 2,4-androstadieno-[3,4-d]-(2'-imino-3'-hydrocarbon substituted)thiazoline is produced when said 3-keto-4,5-oxidoandrostane consists essentially of the 4β,5β-oxido isomer and the reaction is carried out in the absence of acid. Upon treatment with acid, said 2,4-androstadieno isomer is converted to the 3,5-androstadieno isomeric form.

Another process for preparing a 3,5-androstadieno-[3,4-d]-(2'-hydrocarbon substituted imino-3'-hydrocarbon substituted)thiazoline of this invention comprises treating a 3,5-androstadieno-[3,4-d]-(2'-amino-3'-hydrocarbon substituted)thiazolium halide with at least one equivalent of base, followed by treatment of the resulting 3,5-androstadieno-[3,4-d]-(2'-imino - 3' - hydrocarbon substituted)thiazoline with an alkyl halide in the presence of barium oxide and barium hydroxide.

GENERAL DESCRIPTION OF THE INVENTION
COMPOSITION-OF-MATTER ASPECT

The compounds of this invention include 3,5-androstadieno-[3,4-d]-(2'-imino - 3' - hydrocarbon substituted) thiazoline derivatives of following Formula I, the pharmaceutically aceptable acid addition and alkyl halide quaternary salts thereof, and the 3,4,5,6-tetrahydro-2,4-bis-dehydro isomers of Formula I:

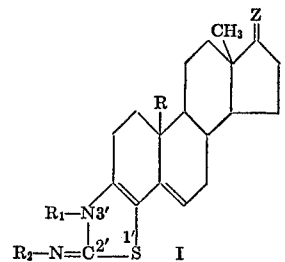

wherein
Z is a member selected from the group consisting of oxygen, (H,βOH),

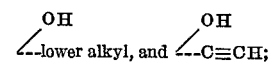
—lower alkyl, and —C≡CH;

R is a member selected from the group consisting of methyl, and hydrogen when Z is

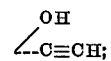
—C≡CH;

$R_1$ is a hydrocarbon radical having up to 8 carbon atoms; and
$R_2$ is a member selected from the group consisting of hydrogen and a hydrocarbon radical having up to 8 carbon atoms.

Included within the term "lower alkyl" are hydrocarbon radicals having up to four carbon atoms, methyl being preferred.

Among the hydrocarbon radicals having up to 8 carbon atoms contemplated for the moieties $R_1$ and $R_2$ are alkyl radicals wherein the carbon atom bonded to the nitrogen atom bears at least two hydrogen atoms such as methyl, ethyl, n-propyl- n-butyl and iso-butyl.

The androstadienothiazolines of this invention are named in accordance with accepted practice. The numbering of the carbon atoms in the steroid nucleus is that well known in the art, and, as shown in Formula I hereinabove, the numbering of the atoms in the thiazoline nucleus begins with the sulfur atom and goes counterclockwise so that the 4' and 5' carbon atoms of the thiazoline ring are identical with the carbon atoms at C–3 and C–4 of the steroid nucleus. Additionally, in accordance with accepted practice for fused ring systems, the bond between positions 1' and 2' of the thiazoline ring is identified as "a," the bond between positions 2' and 3' is identified as "b," etc. Thus, the common bond between the fused ring system of the androstadienothiazolines of this invention is the "d" bond of the thiazoline ring and the 3,4-bond of the steroid ring. The compounds of this invention are thus named as androstadieno-[3,4-d]-thiazolines.

The compounds of Formula I and their pharmaceutically acceptable acid addition salts exhibit contraceptive and antilipogenic properties. Preferred compounds are 3,5-androstadienothiazolines wherein $R_1$ and $R_2$ are both hydrocarbon radicals, since they exhibit greater pharmacological activity than the 2,4-androstadienothiazoline isomers of Formula I and the 2'-imino thiazolines of Formula I (i.e. compounds wherein $R_2$ is hydrogen). Compounds wherein $R_1$ and $R_2$ are methyl or ethyl are particularly preferred since they exhibit greater pharmacological activity than those compounds wherein $R_1$ and $R_2$ have more than two carbon atoms; compounds of special interest being those wherein $R_1$ and $R_2$ are methyl or ethyl and wherein Z is oxygen or

Illustrative of the 3,5-androstadieno-[3,4-d]-(2'-hydrocarbon substituted imino-3'-hydrocarbon substituted)-thiazolines of Formula I (i.e., those wherein $R_1$ and $R_2$ are both hydrocarbon radicals) are compounds such as:

17α-methyl - 17β - hydroxy-3,5-androstadieno-[3,4-d]-(2'-methylimino-3'-methyl)thiazoline (a preferred compound), 17α-methyl - 17β - hydroxy-3,5-androstadieno-[3,4-d]-(2'-ethylimino - 3' - ethyl)thiazoline (a preferred compound), 17α-methyl - 17β - hydroxy-3,5-androstadieno-[3,4-d]-(2'-n-propylimino-3'-n-propyl)thiazoline, 17α-methyl - 17β - hydroxy-3,5-androstadieno-[3,4-d]-(2'-iso-butylimino)-3'-(iso-butyl)thiazoline, 17α-ethynyl - 17β - hydroxy-3,5-estradieno[3,4-d]-(2'-methylimino-3'-methyl)thiazoline, 17-keto - 3,5 - androstadieno-[3,4-d]-(2'-methylimino-3'-methyl)thiazoline (a preferred compound), 17-keto - 3,5 - androstadieno-[3,4-d]-(2'-n-propylimino-3'-n-propyl)thiazoline, and 17-keto - 3,5 - androstadieno-[3,4-d]-(2'-iso-butylimino-3'-iso-butyl)thiazoline.

Other compounds of this invention are compounds of Formula I wherein $R_2$ is hydrogen, e.g. 17α-methyl-17β-hydroxy-[3,4-d]-(2'-imino - 3' - methyl)thiazoline and the 3,4,5,6-tetrahydro-2,4-bis-dehydro isomers of Formula I, e.g. 17 - keto-2,4-androstadieno-[3,4-d]-(2'-ethylimino-3'-ethyl)thiazoline. These compounds usually exhibit less pharmacological activity than the 3,5-androstadieno-[3,4-d]-thiazolines wherein both $R_1$ and $R_2$ are hydrocarbon radicals, and are useful mainly as intermediates in preparing the preferred 3,5-androstadieno-[3,4-d]-2'-hydrocarbon substituted imino - 3' - hydrocarbon substituted)thiazolines according to the processes of this invention discussed hereinbelow.

Also contemplated as within the composition-of-matter aspect of this invention are pharmaceutically acceptable acid addition salts of the androstadienothiazolines of Formula I, which can be made according to known procedures by neutralizing the free base with the appropriate acid. Suitable acids for this purpose are such as hydrochloric, sulfuric, phosphoric, acetic, succinic, citric, maleic, and the like.

The physical embodiments of the acid addition salts of the androstadienothiazolines of Formula I are generally characterized by being white to off-white solids which are usually soluble in water and to some degree in lower alkanols, e.g. methanol and ethanol, and are insoluble in most organic solvents. In general, the acid addition salts possess pharmacological activity similar to that possessed by the parent free base and are administered in a manner similar to that of the free base. The acid addition salts may also be used as an intermediate in the purification of the androstadienothiazolines of Formula I, the androstadienothiazolines being precipitated from an organic solvent (e.g., ether) by the addition of acid, and the acid addition salt thus prepared, after isolation and recrystallization, can be converted to the pure free base by addition of dilute sodium hydroxide to an aqueous solution of the acid addition salt, whereby the purified androstadienothiazolines of Formula I separate as a solid.

Also included within the composition-of-matter aspect of this invention are the pharmaceutically acceptable alkyl halide quaternary ammonium salts of the androstadienothiazolines of Formula I, e.g., the methyl iodide, methyl chloride, and methyl bromide quaternary salts. These are prepared from the free base utilizing known techniques such as treatment of an androstadienothiazoline of this invention, e.g. 17-keto-3,5-androstadieno-[3,4-d]-(2'-methylimino - 3' - methyl)thiazoline and 17α-methyl 17β - hydroxy-3,5-androstadieno-[3,4-d]-(2'-methylimino-3'-methyl)thiazoline, in an inert solvent (e.g. tetrahydrofuran), with an alkyl halide (e.g., methyl iodide) for several hours. The quaternary salts thereby formed, e.g., 17-keto-3,5-androstadieno-[3,4-d]-(2'-dimethylamino-3'-methyl)thiazolium iodide and 17α-methyl-17β-hydroxy-3,5-androstadieno-[3,4-d]-2'-dimethylamino - 3' - methyl) thiazolium iodide, respectively, are isolated and purified utilizing known techniques.

The alkyl halide quaternary salts of the 3,5-androstadienothiazolines of Formula I possess antibacterial activity and, as such, are useful to clean and sterilize laboratory glassware and surgical instruments, and may also be used in combination with soaps, detergents, and wash solutions for sanitation purposes as in the washing of hands, and in the cleaning and sanitizing of hospital rooms and areas used for food preparation such as kitchens, dining halls and the like.

The contraceptive activity of the 3,5-androstadieno-[3,4-d]-(2' - imino-3'-hydrocarbon substituted)thiazolines of Formula I, the acid addition salts thereof and the 3,4,5,6-tetrahydro - 2,4 - bis-dehydro analogs thereof are demonstrated by tests in rats. Thus, 17-keto-3,5-androstadieno-[3,4-d]-(2' - methylimino-3'-methyl)thiazoline and 17α - methyl-17β-hydroxy-3,5-androstadieno-[3,4-d]-(2'-ethylimino-3'-ethyl)thiazoline demonstrate contraceptive activity when administered orally in the rat in dosages of about from 30 to 60 mg./kg. when tested in the postimplantation and mating tests according to known procedures as described in Proceedings of the Second International Congress on Hormonal Steroids, Excerpta Medica International Congress Series No. 132, p. 889 (1966). Additionally, my compounds advantageously possess little or no progestational activity making them of particular value when used as contraceptive agents because they will be less likely to affect the menstrual cycle than progestational agents.

The contraceptively active compounds of this invention, e.g. 17 - keto - 3,5 - androstadieno-[3,4-d]-(2'-methylimino-3-methyl)-thiazoline and 17α-methyl-17β-hydroxy-3,5 - androstadieno - [3,4 - d] - (2'-ethylimino-3-ethyl)-pyrazoline may be administered orally or parenterally by incorporating a therapeutic dosage in conventional pharmaceutical forms such as tablets, capsules, elixirs, suspensions, solutions and the like. They can be administered in admixture with pharmaceutical excipients which are edible and chemically inert to the androstadieno-[3,4-d] thiazolines, typical excipients being cornstarch, lactose, sucrose, gum aragic usually in admixture with an additive such as magnesium stearate, talc, and the like. Other compositions may be used such as fine powders or granules of 3,5-androstadieno-[3,4-d]thiazolines or isomers or derivatives thereof, which compositions may contain diluents and dispersing and surface active agents, and may be presented in a syrup, or in non-aqueous suspensions, in aqueous suspensions, or in an oil.

The anti-obesity properties of the androstadieno-[3,4-d]thiazolines of Formula I, the acid addition salts and 2,4-androstadieno isomers thereof are demonstrated by tests in rats, as evidenced by their ability to inhibit lipogenesis when administered via the oral route to male adult Charles River rats at dose of about 30 mg./kg. The combi- of 17 - keto - 3,5 - androstadieno - [3,4-d]-(2'-methylimino - 3' - methyl)thiazoline, 17α-methyl-17β-hydroxy-3,5 - androstadieno-[3,4-d]-(2'-methylimino-3'-methyl)-thiazoline and 17α - methyl - 17β-hydroxy-3,5-androstadieno - [3,4 - d] - (2' - ethylimino - 3' - ethyl)thiazoline, inhibit lipogenesis when administered orally to male Charles River at a dose of about 30 mg./kg. The combination of contraceptive and anti-obesity properties exhibited by the compounds of this invention is advantageous since there is thereby minimized the occurrence of weight gain usually associated with the administration of contraceptive agents known in the art.

GENERAL DESCRIPTION OF PROCESS ASPECTS OF THE INVENTION

The 3,5 - androstadieno - [3,4-d] - 2' - iminothiazolines of Formula I wherein $R_1$ and $R_2$ are both hydrocarbon radicals, and the 3,4,5,6 - tetrahydro - 2,4 - bis-dehydro isomers thereof, are conveniently prepared from the corresponding 3 - keto - 4,5-oxidoandrostane by treatment thereof with an N,N' - di - hydrocarbon substituted thiourea in a non-reactive, organic solvent whereby is formed a 3,5-androstadieno-[3,4-d]-(2'-hydrocarbon substituted imino-3'-hydrocarbon substituted)thiazoline of Formula I wherein $R_1$ and $R_2$ are the hydrocarbon radicals of the substituted thiourea reagent.

The N,N' - di - substituted thiourea reagents used in this process are known compounds and can be prepared via known procedures. Preferred reagents are N,N'-dimethyl-thiourea and N,N' - diethylthiourea since they lead to preferred compounds of this invention. Other typical N,N'-di-hydrocarbon-thiourea derivatives which may be used in my process include N,N'-n-propylthiourea, N,N'-di-iso-butylthiourea and N,N'-di-n-butylthiourea.

The solvents used in my process may be any non-reactive, organic solvent in which the starting steroid and N,N'-di-substituted thiourea reagent are soluble, and which will not react with a thiourea reagent or the steroid substrate under the conditions of the reaction so as to cause transformations resulting in competing side reactions. Solvents contemplated for my process include lower alkanols (e.g. methanol, ethanol, n-propanol), glycols (e.g. ethyleneglycol and the dimethyl ether thereof), oxygen containing heterocyclics (e.g. dioxane and tetrahydrofuran) and N,N'-dialkylamides (e.g. dimethylformamide and diethylformamide).

My process whereby a 4,5-oxido-17-substituted-androstrane (or estrane) is converted to a 3,5-androstadieno (or estradieno)-[3,4-d]-2'-iminothiazoline is usually carried out at temperatures ranging from about 150° C. (preferably about 75° C. to about 100° C.) with the reaction mixture being heated at reflux temperature for about 2 to about 60 hours (usually 5 to 40 hours) or until the reaction is complete as evidenced by thin layer chromatography.

Generally, when preparing a 3,5-androstadieno-[3,4-d]-2'-iminothiazoline (or a 2,4-androstadieno isomer thereof) of Formula I by my process, the starting steroid (e.g. 4,5-oxidio-17α-methyl-androstan-17β-ol-3-one) and thiourea reagent (e.g. N,N'-dimethyl-thiourea) are dissolved in a lower alkanol (e.g. methanol), the quantity of thiourea reagent ranging from 1 to 4 moles per mole of steroid substrate, preferably 2 to 3 moles thiourea reagent per mole of steroid. The reaction is preferably carried out at temperatures in the range of from about 75° C. to 100° C. until the conversion of the 3-keto-4,5-oxido-androstane to the 3,5-androstadieno-[3,4-d]thiazoline is complete as evidenced by thin layer chromatographic analysis. The resulting androstadieno-[3,4-d]-thiazoline. (e.g. 17α-methyl-17β-hydroxy-3,5-androstadieno - [3,4-d]-(2'-methylimino-3'-methyl)thiazoline) is isolated utilizing known techniques. Usually, the reaction mixture is poured into a large volume of water at about 0° C. and the resulting insoluble fraction collected by filtration then air dried. Further purification may be effected by recrystallization or chromotography.

The 4,5-oxidoandrostane starting compounds for my process are either known or are conveniently prepared according to known procedures from the corresponding 3-keto-4,5-unsubstituted -4-androstene (or 4-estrene) by reaction with alkaline hydrogen peroxide in aqueous methanol. The 4,5-oxido-androstanes (and estranes) are usually formed as a mixture of 4α,5α-oxido-and 4β,5β-oxido derivatives, with the beta form predominating (i.e. about 30% of 4α,5α-oxido isomer and about 70% of 4β,5β-oxido isomer). Unless otherwise designated, the term 4,5-oxidoandrostane (or estrane) as used in this specification or claims implies the presence of an isomeric mixture of 4β,5β-and 4α,5α-oxidoandrostane derivatives. Either isomeric form or a mixture thereof may be used in my process. However, I have found that when the starting 4,5-oxido steroid is substantially all 4β,5β-oxido isomer (e.g. 4β,5β-oxidoandrostane-3,17-dione), upon treatment with a thiourea reagent (e.g. N,N'-diethyl-thiourea), a catalytic quantity of acid (e.g. hydrochloric acid, sulfuric acid, aqueous perchloric acid, p-toluenesulfonic acid) must be present in the reaction mixture in order to obtain isolatable quantities of the preferred 3,5-androstadieno isomeric product (e.g. 17-keto-3,5-androstadieno-[3,4-d]-(2' - ethimino-3'-ethyl)thiazoline. In the absence of acid, a 4β,5β-oxido steroid (e.g. 4β,5β-oxidoandrostane-3,17-dione) upon treatment with a thiourea reagent (e.g. N,N'-diethylthiourea) yields mainly a 3,4,5,6-tetrahydro-2,4-bis-dehydro isomer of the compounds of Formula I (e.g. 17-keto-2,4-androstadieno-[3,4-d]-(2'-ethimino-3'-ethyl)thiazoline) which, in general, have similar pharmacological properties, but of a lesser degree, than the corresponding 3,5-androstadieno derivative of Formula I. The 2,4-androstadieno-[3,4-d]thiazolines are easily converted to the corresponding, isomeric 3,5-androstadieno derivative by treatment with acid (e.g. with anhydrous hydrogen chloride in methylene chloride).

When substantially pure 4α,5α-oxido-steroid is used as starting compound in my process, there is produced only the prefered 3,5-androstadieno-[3,4-d]thiazolines of Formula I.

The compounds of Formula I may also be prepared by another process of this invention whereby an alkyl halide salt of a 3,5-androstadieno-[3,4-d]-2'-aminothiazole (e.g. 17α-methyl-17β-hydroxy-3,5 - androstadieno-[3,4-d]-(2'-amino-3'-hydrocarbon substituted)thiazolium iodide) is treated with at least one equivalent of base (e.g. sodium bicarbonate) in a non-reactive solvent (e.g. dimethylformamide) and the 3,5-androstadieno-[3,4-d]-(2'-imino-3'-substituted)thiazoline thereby formed, i.e. a compound of Formula I wherein $R_1$ is a hydrocarbon radical and $R_2$ is hydrogen, e.g. 17α-methyl-17β-hydroxy-3,5-androstadieno-[3,4-d]-(2'-imino-3'-methyl)thiazoline is reacted with a lower alkyl halide (e.g. methyl iodide) in a non-reactive solvent (e.g. dimethylformamide) in the presence of barium oxide and barium hydroxide to obtain a pharmacologically active compound of Formula I wherein both $R_1$ and $R_2$ are hydrocarbon radicals (e.g. 17α-methyl-17β - hydroxy-3,5 - androstadieno - [3,4-d]-(2'-methylimino-3'-methyl)thiazoline).

The starting alkyl halide thiazolium salts for this process are compounds of following Formula II:

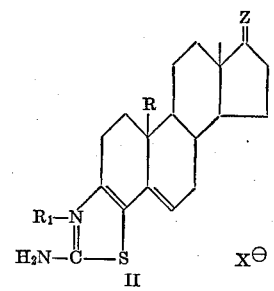

II wherein R, $R_1$ and Z are as defined hereinabove for Formula I, and wherein $X^\ominus$ is a halide anion, preferably chloride, bromide and iodide. The alkyl halide salts are prepared from the free base precursor (i.e. compounds of following Formula III):

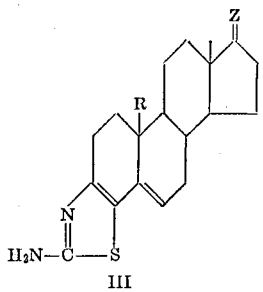

wherein R and Z are as defined hereinabove, by treatment thereof with an alkyl halide in a non-reactive solvent according to known procedures such as described hereinabove.

The free base precursors of Formula III are prepared by treating a 17-Z-3-keto-4,5-oxidoandrostane (or estrane) with thiourea, and isolating the 3,5-androstadieno (or 3,5-estradieno)-[3,4-d] - 2'-aminothiazoles thereby formed utilizing known techniques such as crystallization and chromatography.

In my process whereby a 3,5-androstadieno-[3,4-d]-(2'-amino-3'-hydrocarbon substituted)thiazolium halide upon treatment with at least one equivalent of base in a non-reactive organic solvent is converted to a 3,5-androstadieno-[3,4-d] - (2'-imino-3'-hydrocarbon substituted)thiazoline of Formula I, the base preferably used is sodium bicarbonate; however, other bases may be used such as sodium or potassium carbonate, ammonium hydroxide, dilute sodium hydroxide and dilute potassium hydroxide. The molar quantity of base per mole of androstadienopyrazolium halide is usually about 1.2 to 2 moles. The non-reactive organic solvents used include those discussed hereinabove for the first process aspect of this invention, aqueous dimethylformamide being a preferred solvent.

When converting a 3,5-androstadieno-[3,4-d]-(2'-imino-3'-hydrocarbon substituted)thiazoline of Formula I (prepared as described hereinabove) to a 3,5-androstadieno-[3,4-d]-2'-substituted imino-3'-substituted thiazoline of Formula I by treatment of said androstadieno-[3,4-d] - (2'-imino-3'-hydrocarbon substituted)thiazoline of Formula I with an alkyl halide in dimethylformamide in the presence of barium oxide and barium hydroxide, the molar quantity of alkyl halide per mole of androstadienothiazoline is usually in the range of about 10 to 25, and with barium oxide and barium hydroxide are at least equimolar with the androstadienothiazoline. Equivalent methods for alkylating the 2'-imino function of a (2' - imino - 3' - hydrocarbon substituted)-thiazoline of Formula I will be obvious to those skilled in the art, e.g. with sodium hydride and methyl iodide in anhydrous tetrahydrofuran or dimethylformamide or with silver oxide and methyl iodide in tetrahydrofuran or dimethylformamide.

The following examples are given by way of illustration and are not to be construed as limiting the invention, the scope of which is indicated in the appended claims.

EXAMPLE 1

17α-methyl-17β-hydroxy-3,5-androstadieno-[3,4-d]-(2'-dimethylamino-3'-methyl)thiazolium iodide (A) 17α - methyl - 17β - hydroxy-3,5-androstadieno-[3,4-d]-(2'-methylimino-3'-methyl)thiazoline:

Prepare a solution of 1.1 g. of 4,5-oxido-17α-methylandrostan-17β-ol-3-one and 700 mg. of N,N'-dimethylthiourea in 30 ml. of methanol. Reflux the solution for 22 hours, then pour into ice water and collect and dry the resultant precipitate comprising 17α-methyl-17β-hydroxy-3,5 - androstadieno - [3,4-d]-(2'-methylimino-3'-methyl) thiazoline. Purify by crystallization from acetone to yield 529 mg. of 17α-methyl-17β-hydroxy-3,5-androstadieno-[3,4-d] - (2' - methylimino-3'-methyl)thiazoline; M.P. =233–243° C. (gradual transition of crystals); $[\alpha]_D$ —115.2° (dimethylformamide);

$\lambda_{max.}^{methanol}$ 245 mμ (ε=5,500, inflection); 299 mμ (ε=15,000).

(B) 17α - methyl - 17β - hydroxy-3,5-androstadieno-[3,4 - d] - (2' - dimethylamino - 3'-methyl)thiazolium iodide:

To 127 mg. of 17α-methyl-17β-hydroxy-3,5-androstadieno - [3,4 - d] - (2' - methylimino-3'-methyl)thiazoline in 35 ml. of tetrahydrofuran, add 4 ml. of methyl iodide and stir for 24 hours. Collect the resultant precipitate by filtration and dry to obtain 99 mg. of 17α-methyl - 17β - hydroxy-3,5-androstadieno-[3,4-d]-(2'-dimethylamine - 3'-methyl)thiazoliumidodide; M.P.=198–204° C.; $[\alpha]_D$ —178.4° (dimethylformamide;

$\lambda_{max.}^{methanol}$

EXAMPLE 2

245 mμ (ε=6,800, inflection); 310 mμ (ε=10,300).

Alternate procedure for the preparation of 17α-methyl-17β - hydroxy - 3,5-androstadieno-[3,4-d]-(2'-methylimino-3'-methyl)thiazoline (A) 17α - methyl - 17β - hydroxy-3,5-androstadieno-[3,4-d]-(2'-amino)thiazole:

The requisite intermediate, 4,5-oxido-17α-methylandrostan-17β-ol-3-one, is prepared according to known procedures and is approximately a 2:1 mixture of the 4β, 5β-and 4α,5α-oxido derivatives.

Prepare a solution of 4,5-oxido-17α-methyl-androstan-17β-ol-3-one (954 mg. 3 mmoles) and thiourea (456 mg. 6 mmoles) in 25 ml. of methanol. Heat the solution at reflux temperature for 18 hours, then pour into a mixture of ice and water. Collect by filtration the resultant precipitate comprising 17α - methyl - 17β-hydroxy-3,5-androstadieno - [3,4 - d] - (2'-amino)thiazole. Dry the precipitate and purify by chromatographing through a neutral alumina column eluting with chloroform. Evaporate the combined chloroform eluates to a residue, then crystallize the resultant residue from ethyl acetate to give 311 mg. of 17α-methyl-17β-hydroxy-3,5-androstadieno-[3,4-d]-(2'-amino)thiazole; M.P.=275–280° C.; $[\alpha]_D$ —119.1° (dioxane);

$\lambda_{max.}^{methanol}$ 244 mμ (ε=4,060), 296 mμ (ε=13,520).

(B) 17α - methyl - 17β - hydroxy-3,5-androstadiene-[3,4-d]-(2'-amino-3'-methyl)thiazolium iodide:

To a solution of 1 g. of 17α-methyl-17β-hydroxy-3,5-androstadieno-[3,4-d]-(2'-amino)thiazole in 50 ml. of tetrahydrofuran, add 10 ml. of methyl iodide. Stir the reaction mixture for 18 hours, then collect by filtration the resultant precipitate, wash the precipitate with tetrahydrofuran, then dry in vacuo to obtain 1.329 g. of 17α-methyl-17β - 3,5 - androstadieno-[3,4-d]-(2'-amino)thiazoliumiodide; M.P.=265–269° C. (decomposition); $[\alpha]_D$ —114.9° (dimethylformamide);

$\lambda_{max.}^{methanol}$ 220 mμ (ε=16,800); 295 mμ (ε=12,200).

(C) 17α - methyl - 17 - β-hydroxy-3,5-androstadieno-[3,4-d]-(2'-imino-3'-methyl)thiazoline:

To a solution of 600 mg. of 17α-methyl-17β-hydroxy-3,5 - androstadieno - [3,4 - d]-(2'-amino-3'-methyl) thiazolium iodide in 15 ml. of dimethylformamide, add 2 ml. of saturated aqueous sodium bicarbonate solution. Stir for 15 minutes at room temperature, then pour into water and separate by filtration. Dry the resultant precipitate comprising 17α - methyl - 17β - hydroxy-3,5-androstadieno - [3,4 - d]-(2'-imino-3'-methyl)thiazoline. Purify by crystallization from acetone; yield=312 mg.; M.P. —187° C. (soften), 230° C.; $[\alpha]_D$ —149.1° (dimethylformamide);

$\lambda_{max.}^{methanol}$ 243 m$\mu$ ($\epsilon$=5,100), 289 m$\mu$ ($\epsilon$=13,000).

(D) 17$\alpha$ - methyl-17$\beta$-hydroxy-3,5-androstadieno-[3,4-d]-2'-methylimino-3'-methyl)thiazoline:

To a solution of 3 g. of 17$\alpha$-methyl-17$\beta$-hydroxy-3,5-androstadieno - [3,4-d]-(2'-imino-3'-methyl)thiazoline in 350 ml. of dimethylformamide, add 6 g. of barium oxide, 6 g. of barium hydroxide and 15 ml. of methyl iodide. Stir the reaction mixture at room temperature for 18 hours, filter and concentrate the filtrate in vacuo to a residue. Dissolve the residue in acetone and add to ice water. Collect the resultant precipitate by filtration, dry and chromatograph over silica gel eluting with chloroform. Combine the chloroform eluates and evaporate to a residue comprising 17$\alpha$ - methyl - 17$\beta$-hydroxy-3,5-androstadieno-[3,4-d]-(2'-formylimino-3'-methyl)thiazoline. Purify by crystallization from acetone to obtain 17$\alpha$-methyl-17$\beta$ - hydroxy - 3,5 - androstadieno-[3,4-d]-(2'-formylimino - 3' - methyl)thiazoline as the hemihydrate; yield=145 mg.; M.P.=280–290° C. (bubbling); $[\alpha]_D$ —69.2° (pyridine);

$\lambda_{max.}^{methanol}$ 257 m$\mu$ ($\epsilon$=10,000), 335 m$\mu$ ($\epsilon$=15,000).

Elute the silica gel column further with ethyl acetate. Evaporate the combined eluates to a residue and crystallize the residue from acetone to obtain 267 mg. of 17$\alpha$-methyl - 17$\beta$ - hydroxy - 3,5 - androstadieno-[3,4-d]-(2'-methylimino - 3' - methyl)thiazoline, the physical constants of which are identical to those obtained for the same compound prepared according to the procedure of Example 1.

EXAMPLE 3

17$\alpha$-methyl-17$\beta$-hydroxy-3,5-androstadieno-[3,4-d]-(2'-ethylimino-3'-ethyl)thiazoline Prepare a solution of 2.5 g. of 4,5-oxido-17$\alpha$-methylandrostan - 17$\beta$ - ol - 3 - one and 1.7 g. of N,N'-diethylthiourea in 50 ml. of methanol. Heat the reaction mixture at reflux temperature for 5 hours, then cool and separate the resultant precipitate by filtration. Wash the precipitate with methanol and dry to obtain 832 mg. of 17$\alpha$-methyl-17$\beta$ - hydroxy - 3,5 - androstadieno - [3,4-d]-(2'-ethylimino-3'-ethyl)thiazoline. Concentrate the filtrate to a volume of about 50 ml., add additional N,N'-diethylthiourea to the concentrate and heat at reflux temperature for 14 hours. Cool the reaction mixture, filter and dry the resultant precipitate to obtain an additional 1.322 g. of 17$\alpha$ - methyl - 17$\beta$ - hydroxy - 3,5-androstadieno-[3,4-d]-(2' - ethylimino - 3' - ethyl)thiazoline; M.P. 240° C. (transition), 260–262° C.; $[\alpha]_D$ —95.6° (dimethylformamide);

$\lambda_{max.}^{methanol}$ 254 m$\mu$ ($\epsilon$=6,400, inflection); 303 m$\mu$ ($\epsilon$=15,100).

EXAMPLE 4

17$\alpha$-ethynyl-17$\beta$-hydroxy-3,5-estradieno-[3,4-d]-(2'-methylimino-3'-methyl)thiazoline Dissolve 1.2 g. of 4,5-oxido-17$\alpha$-ethynyl-19-norandrostan -17$\beta$ - ol-3-one (comprising a mixture of the 4$\beta$,5$\beta$-oxido and 4$\alpha$,5$\alpha$-oxido derivatives) and 1.8 g. of N,N'-dimethylthiourea in 25 ml. of methanol. Reflux the solution for 4.5 hours, cool the solution and collect by filtration the resultant crystalline precipitate comprising 17$\alpha$-ethynyl - 17$\beta$ - hydroxy - 3,5 - estradieno-[3,4-d]-(2'-methylimino - 3' - methyl)thiazoline (yield: 350 mg.). Purify by crystallization from methanol. Additional purified product is obtained by concentrating the methanol filtrate in vacuo and chromatographing the resultant residue over silica gel eluting with benzene-acetone (1:2). Evaporate the combined eluates to a residue followed by crystallization from methanol to obtain 299 mg. of 17$\alpha$ - ethynyl - 17$\beta$ - hydroxy - 3,5 - estradieno-[3,4-d]-(2' - methylimino - 3' - methyl)thiazoline; M.P.=220–225° C.; $[\alpha]_D$ —221° (dioxane);

$\lambda_{max.}^{methanol}$ 248 m$\mu$ ($\epsilon$=5,220), 301 m$\mu$ ($\epsilon$=15,900).

EXAMPLE 5

17-keto-3,5-androstadieno-[3,4-d]-(2'-dimethylamino-3'-methyl)thiazolium iodide (A) 17 - keto - 3,5 - androstadieno - [3,4-d]-(2'-methylimino-3'-methyl)thiazoline:

(1) From a mixture of 4$\alpha$,5$\alpha$ (and 4$\beta$,5$\beta$) - oxidoandrostane-3,17-dione:

Unless otherwise specified, the 4,5-oxidoandrostane-3,17-dione starting compound utilized in these procedures is an isomeric mixture comprising 4$\alpha$,5$\alpha$-oxidoandrostane-3,17-dione (30%) and approximately 70% of 4$\beta$,5$\beta$-oxidoandrostane-3,17-dione as determined by nuclear magnetic resonance spectroscopy.

Prepare a solution of 4 g. of 4,5-oxidoandrostane-3,17-dione and 6 g. of N,N'-dimethylthiourea in 100 ml. of methanol. Reflux the solution for 6 hours, then allow the reaction mixture to stand at room temperature for three days. Separate the resultant crystalline precipitate by filtration and dry said precipitate to obtain 2.879 g. of 17 - keto - 3,5 - androstadieno - [3,4-d]-(2'-methylimino - 3' - methyl)thiazoline; M.P.=262–268° C.; $[\alpha]_D$ —21.2° C. (dioxane);

$\lambda_{max.}^{methanol}$ 247 m$\mu$ ($\epsilon$=6,250, inflection), 300 m$\mu$ ($\epsilon$=15,200).

(2) From 4$\alpha$,5$\alpha$-oxidoandrostane-3,17-dione:

Prepare a solution of 380 mg. of 4$\alpha$,5$\alpha$-oxidoandrostane-3,17-dione and 570 mg. of N,N'-dimethylthiourea in 15 ml. of methanol. Heat the reaction mixture at reflux temperature for 6 hours, then allow to stand at room temperature overnight. Separate the resultant crystals by filtration, then wash the precipitate with methanol and dry to obtain 248 mg. of 17 - keto - 3,5-androstadieno-[3,4-d]-(2' - methylimino - 3' - methyl)thiazoline having a melting point rotation and infra-red spectrum identical with that possessed by the compound prepared in above Procedure 1.

(3) From 4$\beta$,5$\beta$-oxidoandrostane-3,17-dione:

(a) Prepare a solution of 6 g. of 4$\beta$,5$\beta$-oxidoandrostane-3,17-dione and 9 g. of N,N'-dimethylthiourea in 150 ml. of methanol. Reflux the solution for 6 hours, then allow it to stand at room temperature for about 18 hours. Isolate the resultant precipitate by filtration and recrystallize the precipitate from acetone to obtain 1.6373 g. of 17 - keto - 2,4 - androstadieno - [3,4 - d] - (2' - methylimino-3'-methyl)thiazoline; M.P.: 240–250° C.; $[\alpha]_D^{26°}$ +237.8° C. (dioxane);

$\lambda_{max.}^{methanol}$ 254 m$\mu$ ($\epsilon$=14,600), 306 m$\mu$ ($\epsilon$=4,900). Inflections at 269 and 280 m$\mu$.

(b) Prepare a solution of 100 mg. of 17-keto-2,4-androstadieno - [3,4-d] - (2' - methylimino - 3' - methyl)thiazoline in 8 ml. of methylene chloride. Bubble hydrogen chloride gas through the solution for about 5 minutes at 20° C., then allow the solution to stand at 20° C. for 64 hours. Wash the solution with aqueous sodium bicarbonate then with water and dry the solution over sodium sulfate. Evaporate the solution in vacuo to a residue comprising 17 - keto - 3,5-androstadieno-[3,4-d]-(2'-dimethylimino-3'-methyl)thiazoline. Purify by recrystallizing the residue from methanol to obtain purified 17-keto-3,5-androstadieno - [3,4 - d] - (2' - methylimino - 3' - methyl)thiazoline $[\alpha]_D^{26°}$ —11.6° C. (dioxane); the infra-red spectrum of this sample is transimposable with the materials obtained in Procedures 5A(1) and 5A(2) hereinabove.

(c) Alternatively, the procedure of Example 5A3(a) is carried out in the presence of a catalytic quantity of acid (e.g. a few drops of 70% perchloric acid) and there is obtained 17 - keto - 3,5-androstadieno-[3,4-d]-(2'-methyl-imino-3'-methyl)thiazoline.

(B) 17 - keto - 3,5 - androstadieno - [3,4 - d] - (2'-dimethylamino-3'-methyl)thiazolium iodide:

To a solution of 750 mg. of 17-keto-3,5-androstadieno-[3,4-d]-(2'-methylimino-3'-methyl)thiazoline in 75 ml. of dry tetrahydrofuran, add 12 ml. of methyl iodide and stir the reaction mixture for three days in the dark. Collect the resultant precipitate by filtration, wash with dry tetrahydrofuran and air dry to obtain 528 mg. of 17-keto - 3,5 - androstadieno - [3,4-d] - (2' - dimethylamino-3'-methyl)thiazolium iodide; M.P.=190–195° C.; $[\alpha]_D$ —131.6° (dimethylformamide);

$\lambda_{max.}^{methanol}$ 246 m$\mu$ ($\epsilon$=7,250), 310 m$\mu$ ($\epsilon$=11,200).

EXAMPLE 6

17-keto-3,5-androstadieno-[3,4-d]-(2'-ethylimino-3'-ethyl)thiazolium iodide (A) 17 - keto - 2,4 - androstadieno - [3,4 - d] - (2'-ethylimino-3'-ethyl)thiazoline:

Prepare a solution of 3 g. of an isomeric mixture of 4,5-oxidoandrostane-3,17-dione and 2 g. of N,N'-diethylthiourea in 75 ml. of methanol. Reflux the solution for 5 hours, cool to room temperature, collect the resultant crystalline precipitate by filtration, and air dry the precipitate to obtain 1.2 g. of 17-keto-2,4-androstadieno-[3,4-d]-(2'-ethylimino-3'-ethyl)thiazoline; M.P. 142–146° C.; $[\alpha]_D^{26°}$ +183.9° C. dioxane);

$\lambda_{max.}^{methanol}$ 253 m$\mu$ ($\epsilon$=15,150); 304 m$\mu$ ($\epsilon$=5,000).

(B) 17 - keto-3,5 - androstadieno - [3,4 - d] - (2'-ethylimino-3'-ethyl)thiazoline:

In a manner similar to that described in Example 5A3(b), treat 17-keto-2,4-androstadieno-[3,4-d]-(2'-ethylimino-3'-ethyl)thiazoline in methylene chloride with hydrogen chloride, and isolate and purify the resultant product to obtain 17-keto-3,5-androstadieno-[3,4-d]-2'-(ethylimino-3'-ethyl)thiazoline.

(C) 17 - keto - 3,5 - androstadieno - [3,4 - d] - (2'-diethylimino-3'-ethyl)-thiazolium iodide:

In a manner similar to that described in Example 5B, treat 17-keto-3,5-androstadieno-[3,4-d]-(2'-ethylimino-3'-ethyl)thiazoline with ethyl iodide in tetrahydrofuran and isolate and purify the resultant product to obtain 17-keto-3,5 - androstadieno - [3,4 -d] - (2' - diethylimino - 3'-ethyl)thiazolium iodide.

EXAMPLE 7

17-keto-3,5-androstadieno-[3,4,-d]-(2'-n-propylimino-3'-n-propyl)thiazoline

Dissolve 3 g. of 4,5-oxidoandrostane-3,17-dione and 3 g. of N,N'-di-n-propylthiourea in 60 ml. of methanol. Heat the reaction mixture at reflux temperature for 6 hours, then allow to stand at room temperature for 16 hours. Cool the reaction mixture to 5° C. and collect the resultant precipitate by filtration to obtain 2.44 g. of product comprising 17-keto-3,5-androstadieno-[3,4-d]-(2'-n-propylimino-3'-n-propyl)thiazoline. Purify by chromatographing the precipitate over silica gel, eluting with chloroform-ethyl acetate (49:1) followed by crystallization from methylene chloride-methanol.

In the above procedure, by utilizing 17$\alpha$-methyl-4,5-oxidoandrostan-17$\beta$-ol-3-one as starting steroid, there is obtained 17$\alpha$ - methyl - 17$\beta$ - hydroxy - 3,5-androstadieno-[3,4-d]-(2'-n-propylimino-3'-n-propyl)thiazoline.

EXAMPLE 8

17$\beta$-hydroxy-3,5-androstadieno-[3,4-d]-(2'-methylimino-3'-methyl)thiazoline Dissolve 2.22 g. of 17$\beta$-hydroxy-4,5-oxidoandrostane-3-one and 3.33 g. of N,N'-dimethylthiourea in 65 ml. of methanol. Heat the reaction mixture at reflux temperature for 5 hours, then allow to stand at room temperature overnight. Cool the reaction mixture to 0°, and collect the resultant precipitate by filtration to obtain 1.13 g. of product comprising 17$\beta$-hydroxy-3,5-androstadieno-[3,4-d]-(2'-methylimino-3'-methyl)thiazoline.

EXAMPLE 9

17-keto-3,5-androstadieno-[3,4-d]-(2-iso-butylimino-3'-iso-butyl)thiazoline

In a manner similar to that described in Example 7, treat 4,5-oxidoandrostane-3,17-dione with N,N'-di-iso-butylthiourea in methanol. Isolate and purify the resultant product in a manner similar to that described to obtain 17 - keto - 3,5 - androstadieno - [3,4 - d] - 2' - iso - butyl-imino-3'-iso-butyl)thiazoline.

By utilizing 17$\alpha$-methyl-4,5-oxidoandrostan-17$\beta$-ol-3-one as starting steroid in the above procedure, there is obtained 17$\alpha$-methyl-17$\beta$-hydroxy-3,5-androstadieno-[3,4-d]-(2'-iso-butylimino-3'-iso-butyl)thiazoline.

The present invention includes within its scope pharmaceutical compositions comprising my novel 3,5 - androstadieno-[3,4-d]-(2' - imino-3'-hydrocarbon substituted) thiazolines of Formula I, or 2,4-androstadieno isomers or pharmaceutically acceptable acid addition salts thereof, in association with a compatible, pharmaceutically acceptable carrier or coating. Also included within my invention is the method of eliciting a contraceptive response in an ovulating animal which comprises orally administering to said animal a non-toxic, contraceptively effective amount of a member selected from the group consisting of a 3,5-androstadieno-[3,4-d]-(2'-imino-3'-hydrocarbon substituted)thiazoline of Formula I, the pharmaceutically acceptable salts and the 3,4,5,6-tetrahydro-2,4-bis dehydro isomers thereof.

Also included within this invention is the method of inhibiting lipogenesis in a host in need of such treatment which comprises orally administering to said host, an effective, anti-lipogenic amount of a compound selected from the group consisting of 3,5-androstadieno-[3,4-d]-2'-iminothiazoline of Formula I, a pharmaceutically acceptable acid addition salt and a 3,4,5,6-tetrahydro-2,4-bis-dehydro-isomer thereof.

The compositions may be administered parenterally or orally, oral administration being preferred. In carrying out the methods of this invention, the active ingredient is normally combined with conventional pharmaceutical diluents and carriers which are based upon the desired route of administration. In carrying out the methods, the active group can, if desired, be combined with other therapeutically active compositions customarily included in contraceptive and anti-lipogenic formulations.

The individual unit dosage and frequency and mode of administration for use as a contraceptive is similar to that used with known contraceptive agents (e.g. norethynodrel) and is determined by the age, weight, species, underlying physical condition and route of administration. The exact amount to be administered should be non-toxic, yet pharmaceutically effective in eliciting a contraceptive response. Generally, for effecting contraception, the compositions are administered orally so as to give a daily dose of from about 10 to about 30 mgm./kg. of a 3,5-androstadieno-[3,4-d]-2'-iminothiazole of Formula I, or of a 2,4-androstadieno isomer thereof, or a pharmaceutically acceptable acid addition salt thereof.

For effecting anti-lipogenic response, the compositions are usually administered orally so as to give a daily dose of from about 20 to about 50 mgm./kg. of a compound of my invention as disclosed hereinabove.

The following examples illustrate pharmaceutical compositions according to the invention:

EXAMPLE 10
[Capsules]

| | Mg./capsule | |
|---|---|---|
| | I | II |
| 17-keto-3,5-androstadieno-[3,4-d]-(2'-methylimino-3'-methyl)thiazoline (micronized) | 10.00 | 25.00 |
| Lactose, U.S.P. | 279.00 | 349.00 |
| Sodium lauryl sulfate, U.S.P. | 10.00 | 25.00 |
| Corn starch, U.S.P. | 100.00 | 100.0 |
| Magnesium stearate, U.S.P. | 1.00 | 1.00 |
| Total | 400.00 | 500.00 |

Procedure: Blend and mill the 17-keto-3,5-androstadieno-[3,4-d]-(2' - methylimino-3'-methyl)thiazoline, lactose, sodium lauryl sulfate and corn starch; add the magnesium stearate; mix and fill into hard gelatin capsules.

EXAMPLE 11
[Tablets]

| | Mg./tablet | |
|---|---|---|
| | I | II |
| 17-keto-3,5-androstadieno-[3,4-d]-(2'-methylimino-3'-methyl)thiazoline (micronized) | 10.00 | 25.00 |
| Lactose, U.S.P. | 204.00 | 238.00 |
| Sodium lauryl sulfate, U.S.P. | 10.00 | 25.00 |
| Povidone, N.F. | 17.50 | 22.50 |
| Corn starch, U.S.P. | 70.00 | 90.00 |
| Purified water | Evap. | Evap. |
| Dry | | |
| Corn starch, U.S.P. | 35.00 | 45.00 |
| Magnesium stearate, U.S.P. | 3.50 | 4.50 |
| Total | 350.00 | 450.00 |

Procedure: Prepare a damp mass consisting of 17-keto-3,5-androstadieno-[3,4-d]-2'-methylimino - 3' - methyl)thiazoline, diluents, wetting agent and granulating agents; dry; reduce to uniform granules; add the disintegrant and lubricant; mix; and compress into tablets.

I claim:

1. A compound selected from the group consisting of a 3,5 - androstadieno - [3,4-d] - 2' - iminothiazoline of the following structural formula, the pharmaceutically acceptable acid addition and alkyl halide quaternary salts thereof, and the 3,4,5,6 - tetrahydro - 2,4 - bis - dehydro isomers thereof:

wherein
Z is a member selected from the group consisting of oxygen, (H,βOH), $$\diagup^{OH}_{\text{---lower alkyl, and}} \diagup^{OH}_{\text{---C≡CH}}$$

R is a member selected from the group consisting of methyl, and hydrogen when Z is $$\diagup^{OH}_{\text{---C≡CH}}$$

$R_1$ is a hydrocarbon radical having up to 4 carbon atoms; wherein the carbon atom bonded to the nitrogen atom bears at least two hydrogen atoms; and $R_2$ is a member selected from the group consisting of hydrogen and a hydrocarbon radical having up to 4 carbon atoms wherein the carbon atom bonded to the nitrogen atom bears at least two hydrogen atoms.

2. A compound according to claim 1 wherein $R_1$ and $R_2$ are each a member selected from the group consisting of methyl and ethyl.

3. A compound according to claim 1 wherein $R_1$ and $R_2$ are each a member selected from the group consisting of methyl and ethyl, and Z is a member selected from the group consisting of oxygen and $$\diagup^{OH}_{\text{---methyl}}$$

4. A compound according to claim 1, wherein Z is $$\diagup^{OH}_{\text{---methyl}}$$

and R, $R_1$ and $R_2$ are each methyl, said compound being 17α-methyl - 17β - hydroxy - 3,5 - androstadieno-[3,4-d]-(2'-methylimino-3'-methyl)thiazoline.

5. A compound according to claim 1 wherein Z is $$\diagup^{OH}_{\text{---methyl}}$$

R is methyl and $R_1$ and $R_2$ are each ethyl, said compound being 17α - methyl - 17β - hydroxy - 3,5 - androstadieno-[3,4-d]-(2'-ethylimino-3'-ethyl)thiazoline.

6. A compound according to claim 1, wherein Z is oxygen, R, $R_1$ and $R_2$ are methyl, said compound being 17 - keto - 3,5 - androstadieno - [3,4-d] - (2' - methylimino-3'-methyl)thiazoline.

7. The process which comprises treating a 4,5-oxido-androstane of the following Formula A:

(A)

wherein Z is a member selected from the group consisting of oxygen, (H,βOH), and $$\diagup^{OH}_{\text{---lower alkyl}} \text{ and } \diagup^{OH}_{\text{---C≡CH}}$$

and R is a member selected from the group consisting of methyl, and hydrogen when Z is $$\diagup^{OH}_{\text{---C≡CH}}$$

with a thiourea derivative having the following Formula B:

$$R_1-HC-\overset{S}{\underset{\|}{C}}-NH-R_2 \quad (B)$$

wherein $R_1$ and $R_2$ are each a hydrocarbon radical having up to 4 carbon atoms, wherein the carbon atom bonded to the nitrogen atom bears at least two hydrogen atoms in a non-reactive organic solvent, in the presence of a catalytic quantity of acid when said 4,5-oxido of Formula A consists essentially of the 4β,5β-oxidoisomer thereof;

whereby is formed a 3,5-androstadieno-[3,4-d]-2'-iminothiazoline of the following Formula I:

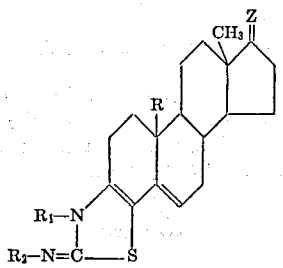

wherein R, Z, R$_1$ and R$_2$ are as hereinabove defined.

8. The process according to claim 7, when carried out in refluxing methanol, when said 4,5-oxidoandrostane of Formula A consists essentially of the 4α,5α-oxido-isomer or is a mixture of the 4α,5α-oxido and the 4β,5β-oxido isomers of Formula A and when R$_1$ and R$_2$ in said thiourea derivative (B) is a lower alkyl having up to two carbon atoms, whereby is formed a 3,5-androstadieno-[3,4-d] - 2' - iminothiazoline of Formula I wherein R$_1$ and R$_2$ are each a lower alkyl having up to 2 carbon atoms.

9. The process of claim 7, including the added step of treating said compound of Formula I thereby formed with an alkyl halide to produce a quaternary alkyl halide of Formula I.

10. The process which comprises treating a 4β,5β-oxidoandrostane of following Formula A:

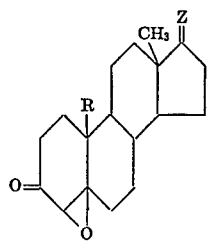

wherein Z is a member selected from the group consisting of oxygen (H,βOH),

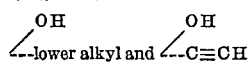

and R is a member selected from the group consisting of methyl, and hydrogen when Z is

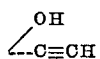

with a thiourea derivative of following Formula B:

wherein R$_1$ and R$_2$ are each a hydrocarbon radical having up to 4 carbon atoms wherein the carbon atom bonded to the nitrogen atom bears at least two hydrogen atoms in a non-reactive organic solvent and in the absence of acid, whereby is formed a 2,4-androstadieno-[3,4-d]-2'-iminothiazoline of following Formula I:

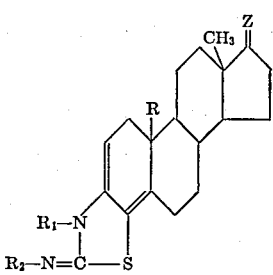

wherein Z, R, R$_1$ and R$_2$ are as hereinabove defined.

11. The process according to claim 10 including the added step of treating a compound of Formula I thereby obtained, with acid whereby is formed the corresponding 2,3,4,5-tetrahydro-3,5-bis-dehydro-isomer thereof of the following Formula II:

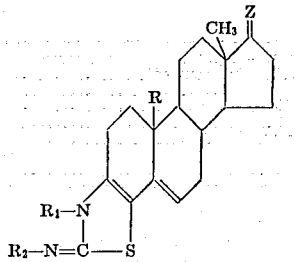

wherein R, Z, R$_1$ and R$_2$ are as defined in claim 10.

12. The process which comprises treating a 3,5-androstadieno-[3,4-d]-2'-aminothiazolium halide of the following structural Formula A:

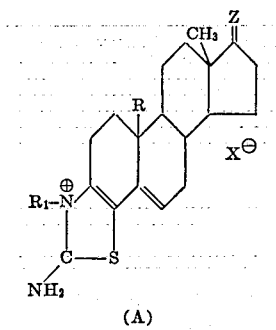

wherein Z is a member selected from the group consisting of oxygen, (H,βOH),

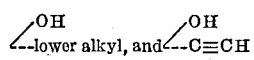

R is a member selected from the group consisting of methyl, and hydrogen when Z is

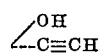

R$_1$ is a hydrocarbon having up to 4 carbon atoms wherein the carbon atom bonded to the nitrogen atom bears at least two hydrogen atoms; and X is an anion selected from the group consisting of iodide, bromide and chloride;

with at least one equivalent of base in a non-reactive organic solvent; whereby is formed a 3,5-androstadieno-[3,4-d]-2'-iminothiazoline of the following Formula B:

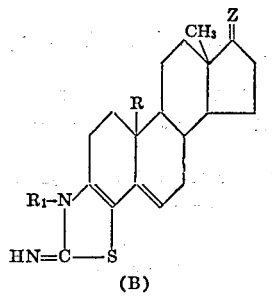

wherein R, R$_1$ and Z are as hereinabove defined.

13. The process of claim 12, including the step of isolating the thereby formed 3,5-androstadieno-[3,4-d]-2'-iminothiazoline of Formula B.

14. The process of claim 12 including the added step of treating a 3,5-androstadieno-[3,4-d]-2'-iminothiazoline of Formula B with a lower alkyl halide in dimethylformamide in the presence of barium oxide and barium hydroxide whereby is formed a 3,5-androstadieno-[3,4-d]-2'-iminothiazoline of the following Formula I:

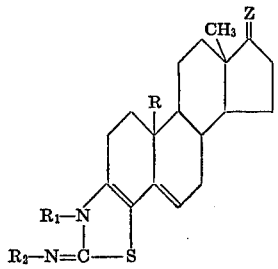

I wherein $R_2$ is a lower alkyl radical from said lower alkyl halide and R, $R_1$ and Z are as defined in claim 12.

15. The process of claim 13 when in said compounds A and B, R and $R_1$ are methyl, and Z is

wherein said base in a non-reactive organic solvent is sodium bicarbonate in aqueous dimethylformamide, and wherein said lower alkyl halide is methyliodide, whereby is formed 17α-methyl-17β-hydroxy-3,5-androstadieno-[3,4-d]-(2'-methylamino-3'-methyl)thiazoline.

References Cited
FOREIGN PATENTS
1,169,442  12/1964  Germany.

HENRY A. FRENCH, Primary Examiner

U.S. Cl. X.R.

260—239.55 R; 424—270

PO-1050
(5/69)

UNITED STATES PATENT OFFICE
CERTIFICATE OF CORRECTION

Patent No. 3,772,283             Dated November 13, 1973

Inventor(s) Thomas L. Popper

It is certified that error appears in the above-identified patent and that said Letters Patent are hereby corrected as shown below:

Column 1, line 6, "Verone" should read ---Verona---; line 39, "hereby" should read ---thereby---; line 63, "4-keto" should read ---3-keto---. Column 4, line 60, "aragic" should read ---arabic---; line 74, "Charles River
Rats at dose of about 30 mg./kg. The combi-" should read
---Charles River Rats (CD strain). Thus, for example each---;
Col. 5, line 48, "from about 150°C" should read ---from about 25°C to about 150°C---; line 58, "4,5-oxidio-" should read ---4,5-oxido-----. Column 6, lines 62-75, Formula II, the lower left-hand section of the formula should appear as follows

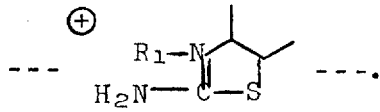

Column 8, lines 19 and 20, "(2'-dimethylamine-3'-methyl)" should read ---(2'-dimethylamino-3'-methyl)---; line 21, "(dimethylformamide;" should read ---(dimethylformamide )---; lines 24 and 25, EXAMPLE 2 should appear as follows ---245 mµ ($\xi$=6,800, inflection); 310 mµ ($\xi$=10,300).
                EXAMPLE 2---;

line 52, "3,5-androstadiene" should read ---3,5-androstadieno--
line 60, "17β-3,5-androstadieno" should read ---17β-hydroxy-3,5 androstadieno---. Column 9, line 2, "M.P.-187°C" should read
---M.P.=187°C---. Column 12, lines 15 and 16, "17-keto-3,5-androstadieno-/3,4-d_/-(2-iso-butylimino-3'-iso-butyl)thiazoline" should read ---17-keto-3,5-androstadieno-/3,4-d_/-(2-iso-butylimino-3'-iso-butyl)thiazoline---. Column 14, line 67, claim 7, Formula (B) should appear as follows

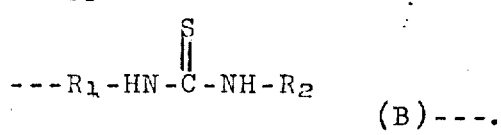

Signed and sealed this 17th day of September 1974.

(SEAL)
Attest:

McCOY M. GIBSON JR.                    C. MARSHALL DANN
Attesting Officer                      Commissioner of Patents